(12) United States Patent
Nakashima (10) Patent No.: US 11,370,274 B2
(45) Date of Patent: Jun. 28, 2022

(54) BLOW-OFF DEVICE OF AIR CONDITIONER

(71) Applicant: HONDA MOTOR CO., LTD., Tokyo (JP)

(72) Inventor: Yu Nakashima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/136,065

(22) Filed: Dec. 29, 2020

(65) Prior Publication Data
US 2021/0206237 A1 Jul. 8, 2021

(30) Foreign Application Priority Data
Jan. 6, 2020 (JP) .............................. JP2020-000434

(51) Int. Cl.
*B60H 1/34* (2006.01)
(52) U.S. Cl.
CPC .................................. *B60H 1/345* (2013.01)
(58) Field of Classification Search
CPC ........ B60H 1/345; B60H 1/3428; B60H 1/34; B60H 1/3421; F24F 13/06; F24F 13/15
USPC ................................................ 454/115, 162
See application file for complete search history.

(56) References Cited

U.S. PATENT DOCUMENTS

| 8,382,564 B2* | 2/2013 | Miki ........................ B60H 1/34 454/155 |
| 8,662,970 B2* | 3/2014 | Nagasaka ............... F24F 13/06 454/152 |
| 9,163,848 B2* | 10/2015 | Doll ........................ B60H 1/345 |
| 10,899,200 B2* | 1/2021 | Doll ........................ B60H 1/3428 |
| 2014/0357179 A1* | 12/2014 | Londiche .............. F24F 13/075 454/322 |
| 2016/0152116 A1* | 6/2016 | Albin ................... B60H 1/3421 454/155 |
| 2019/0283544 A1 | 9/2019 | Nakashima |

FOREIGN PATENT DOCUMENTS

WO 2018/074022 4/2018

* cited by examiner

*Primary Examiner* — Jessica Yuen
(74) *Attorney, Agent, or Firm* — Amin, Turocy & Watson, LLP (57) ABSTRACT

A blow-off device (10) is equipped with a wind direction variable means (40) and a pressure adjustment unit (60) in a ventilation passage (50). The wind direction variable means is rotatably provided in the ventilation passage and can change a conditioned air from the inflow port (50c) toward a blow-off port (50d) and a second inclined part (52r) along an intermediate part (53r). The pressure adjustment unit prevents the pressure of the ventilation passage from exceeding a predetermined value by releasing the conditioned air to the outside of the ventilation passage. A bypass inlet (66) of the pressure adjustment unit is provided on an upstream side of an end portion (42d) in a +X direction at the time of maximum rotation of the wind direction variable means.

16 Claims, 6 Drawing Sheets

BLOW-OFF DEVICE OF AIR CONDITIONER

CROSS-REFERENCE TO RELATED APPLICATION

Priority is claimed on Japanese Patent Application No. 2020-000434, filed Jan. 6, 2020, the content of which is incorporated herein by reference.

BACKGROUND OF THE INVENTION

Field of the Invention

The present invention relates to a blow-off device of an air conditioner.

Description of Related Art

A vehicle is equipped with an air conditioner. Conditioned air conditioned by the air conditioner is blown off from a blow-off device into a passenger compartment. The blow-off device is equipped with a wind direction variable means. The wind direction variable means is formed so that a wind direction can be changed, for example, in a vertical direction of a vehicle.

In recent years, a blow-off device equipped with an inclined part in a case in addition to the wind direction variable means has been proposed (see, for example, Patent Document 1 (International Publication No. 2018/074022)). This blow-off device changes the wind direction of the conditioned air toward the inclined part by the wind direction variable means. Further, the blow-off device blows off the conditioned air in a predetermined direction along an inner surface of the inclined part. The blow-off device is equipped with a plurality of fins as the wind direction variable means.

In the blow-off device of Patent Document 1, when a rotation angle of the plurality of fins of the wind direction variable means increases, a cross-sectional area of a flow passage of a ventilation passage decreases, and the pressure of the ventilation passage increases. Along with this, a flow velocity in a place having a small cross-sectional area of the flow passage of the ventilation passage increases, and wind noise increases.

An object of the present invention is to provide a blow-off device of an air conditioner capable of suppressing the flow velocity in a place having a small cross-sectional area of a flow passage of a ventilation passage and suppressing wind noise.

SUMMARY OF THE INVENTION

The blow-off device of the air conditioner of the present invention employ the following configurations.

(1) The blow-off device of the air conditioner according to an aspect of the present invention is equipped with a case (e.g., a case 20 in the embodiment) connected to an air conditioning unit (e.g., an air conditioner 3 in the embodiment) of a vehicle (e.g., a vehicle 1 in the embodiment) via a duct (e.g., a duct 5 in the embodiment); an inflow port (e.g., an inflow port 50c in the embodiment) provided on the duct side of the case and connected to the duct; a blow-off port (e.g., a blow-off port 50d in the embodiment) provided on a passenger compartment (e.g., a passenger compartment 1a in the embodiment) side of the case to blow off air toward the passenger compartment; a ventilation passage (e.g., a ventilation passage 50 in the embodiment) formed inside the case so that ventilation is allowed from the inflow port to the blow-off port; an inclined part (e.g., second inclined parts 52, 52r and 52s in the embodiment) which is inclined in an inward direction of the case in a ventilation direction on the blow-off port side of the ventilation passage; an intermediate part (e.g., intermediate parts 53, 53r and 53s in the embodiment) formed between the inflow port and the inclined part; a wind direction variable means (e.g., a wind direction variable means 40 in the embodiment) rotatably provided in the ventilation passage and capable of changing a wind direction from the inflow port toward the intermediate part and the inclined part; and a pressure adjustment unit (e.g., a pressure adjustment unit 60 in the embodiment) which is provided in the ventilation passage to prevent the pressure of the ventilation passage from exceeding a predetermined value by releasing air to the outside of the ventilation passage, in which an inlet (e.g., a bypass inlet 66 in the embodiment) of the pressure adjustment unit is provided on an upstream side of a downstream side end portion (e.g., an end portion 41d of a first outer fin in a +X direction, and an end portion 42d of a second outer fin in a +X direction in the embodiment) at the time of maximum rotation of the wind direction variable means.

According to the configuration of (1), the pressure adjustment unit is provided in the ventilation passage, and the inlet of the pressure adjustment unit is provided on the upstream side of the downstream side end portion at the time of maximum rotation of the wind direction variable means. Therefore, it is possible to prevent the pressure of the ventilation passage from exceeding a predetermined value by releasing air (conditioned air) from the inlet of the pressure adjustment unit to the pressure adjustment unit. As a result, it is possible to suppress the flow velocity of air in a place where the cross-sectional area of the flow passage of the ventilation passage is small, and to suppress wind noise.

(2) In the blow-off device of the air conditioner according to the aspect of (1), the outlet of the pressure adjustment unit may be provided downstream of the inclined part and may be formed to face a center (e.g., a center 55 in the embodiment) of the case rather than an angle (e.g., the angle θ1 of the embodiment) of the inclined part.

Here, the air that hits the inclined part is guided to the blow-off port along the inclined surface toward one side, and is blown off from the blow-off port to the passenger compartment toward one side. According to the configuration of (2), the outlet of the pressure adjustment unit is formed downstream of the inclined part to face the center of the case rather than the angle of the inclined part. As a result, a blowing-off angle of the air blown off to the passenger compartment can be widened by making the air blown off from the outlet of the pressure adjustment unit hit the air blown off to the passenger compartment toward one side.

(3) In the blow-off device of the air conditioner according to the aspect of (1) or (2), the wind direction variable means may include a plurality of fins (e.g., a plurality of fins 40f in the embodiment), and the inlet of the pressure adjustment unit may be provided on an upstream side of a downstream side end portion (e.g., an end portion 41d of the first outer fin in the +X direction and an end portion 42d of the second outer fin in the +X direction in the embodiment) at the time of maximum rotation of the outer fin (e.g., the first outer fin 41 and the second outer fin 42 in the embodiment) of the plurality of fins.

According to the configuration of (3), because a plurality of fins are provided in the wind direction variable means, the outer fins approach the wall surface of the ventilation passage at the time of maximum rotation of the fins. Therefore, the cross-sectional area of the flow passage between the outer fin and the wall surface of the ventilation passage easily decreases. Therefore, the inlet of the pressure adjustment unit is provided on the upstream side of the downstream side end portion at the time of maximum rotation of the outer fin. Therefore, air can be released to the inlet of the pressure adjustment unit from a place where the cross-sectional area of the flow passage easily decreases. As a result, the flow velocity of air between the outer fins and the wall surface of the ventilation passage can be suppressed more satisfactorily, and the wind noise can be suppressed more effectively.

(4) In the blow-off device of the air conditioner according to the aspect of any one of (1) to (3), the inlet of the pressure adjustment unit may be inclined in an outward direction of the ventilation passage toward the downstream side.

According to the configuration of (4), in a state in which the air is directed to the inclined part by the wind direction variable means, the inlet of the pressure adjustment unit can be inclined according to the wind direction of the air to increase the area of the inlet. As a result, air can easily flow into the inlet, and air can smoothly flow into the inlet.

(5) In the blow-off device of the air conditioner according to the aspect of any one of (1) to (4), an upstream side inclined part (e.g., first inclined parts 51, 51r and 51s in the embodiment) inclined in the outward direction of the case toward the ventilation direction may be provided between the inflow port and the intermediate part, and the inlet of the pressure adjustment unit may be provided on the upstream side inclined part.

According to the configuration of (5), the upstream side inclined part is inclined in the outward direction of the case between the inflow port and the intermediate part, and the inlet of the pressure adjustment unit is provided in the upstream side inclined part.

Here, in a state in which the air flows straight to the blow-off port along the intermediate part due to the wind direction variable means, it is possible to suppress the air from flowing to the upstream side inclined part. Therefore, by providing the inlet of the pressure adjustment unit on the upstream side inclined part, it is possible to prevent air from flowing into the inlet. As a result, in a state in which the air flows straight to the blow-off port along the intermediate part due to the wind direction variable means, the influence of the pressure adjustment unit can be suppressed.

According to the present invention, the blow-off device of the air conditioner is equipped with a pressure adjustment unit at the ventilation passage, and the inlet of the pressure adjustment unit is provided on an upstream side of a downstream side end portion at the time of maximum rotation of the wind direction variable means. As a result, it is possible to suppress the flow velocity in a place having the small cross-sectional area of the flow passage of the ventilation passage and to suppress wind noise.

DETAILED DESCRIPTION OF THE INVENTION

Hereinafter, an embodiment of the blow-off device of the air conditioner according to the present invention will be described while referring to the attached drawings.

An X direction, a Y direction and a Z direction used in the following description are defined as follows. The X direction is an extending direction (a ventilation direction) of a ventilation passage formed inside the blow-off device. A+X direction is an opening direction of a blow-off port formed on a downstream side of the ventilation passage. The Y direction and the Z direction are directions orthogonal to each other and are each orthogonal to the X direction. As an example, when a cross-sectional shape of the ventilation passage orthogonal to the X direction is rectangular, a longitudinal direction is the Y direction and a transverse direction is a Z direction. To give an example in relation to a vehicle, the X direction is a front-rear direction of the vehicle, and the +X direction is a direction from the front to the rear of the vehicle. The Y direction is a left-right (width) direction of the vehicle, and a +Y direction is a direction from right to left from the forward direction of the vehicle. The Z direction is a vertical direction of the vehicle, and a +Z direction is a direction from a bottom to a top of the vehicle. However, the X direction, the Y direction, and the Z direction are not limited to these examples.

Figure 1:
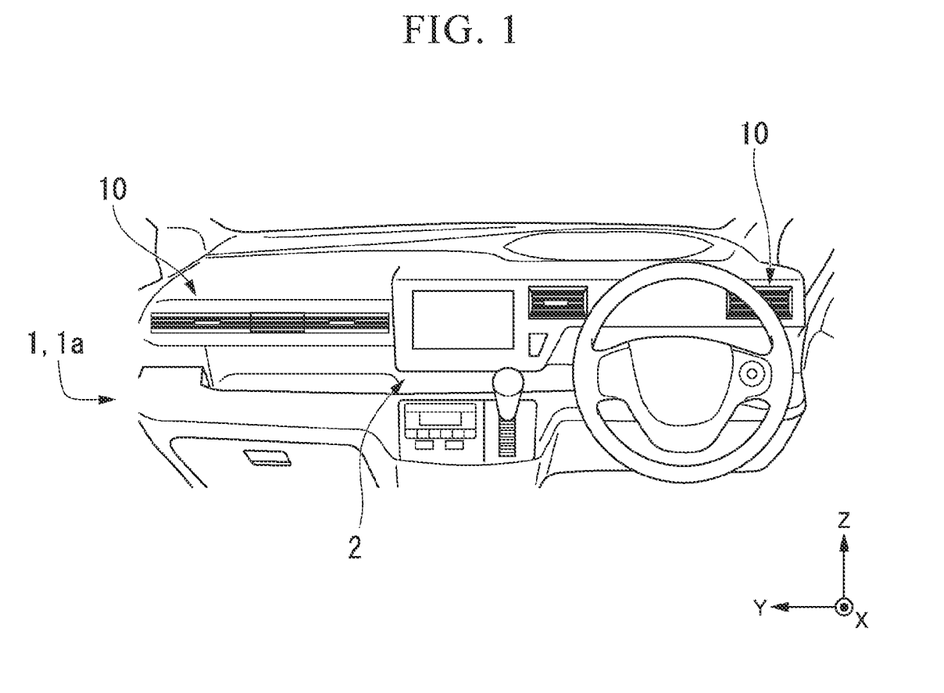
FIG. 1 is a front view of an instrument panel provided with a blow-off device according to an embodiment of the present invention.
Figure 2:
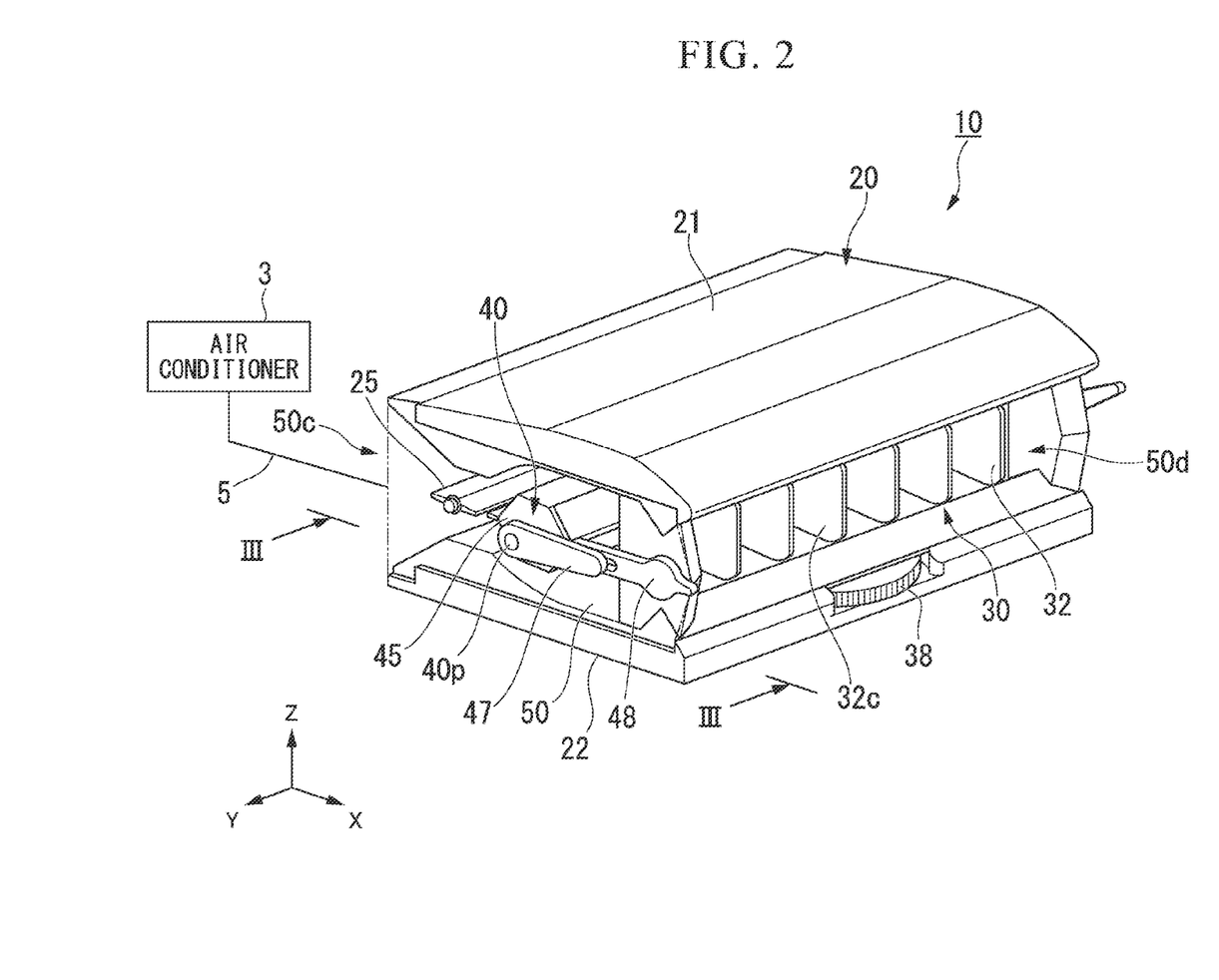
FIG. 2 is a perspective view showing the blow-off device according to an embodiment.

FIG. 1 is a front view of an instrument panel provided with a blow-off device. FIG. 2 is a perspective view showing the blow-off device in a state in which the pressure adjustment unit is removed.

As shown in FIGS. 1 and 2, a vehicle 1 is equipped with an air conditioner (air conditioner unit) 3. The air conditioner 3 adjusts a temperature, a humidity, and the like of the air of a passenger compartment 1a. A blow-off device (register) 10 is connected to the air conditioner 3 via a duct 5. The conditioned air (air) conditioned by the air conditioner 3 is blown off from the blow-off device 10 to the passenger compartment 1a. The blow-off device 10 is, for example, a thin blow-off device provided on the instrument panel 2 of the passenger compartment 1a. The instrument panel 2 is attached to a front part of the passenger compartment 1a.

Although an example in which the blow-off device 10 is provided on the instrument panel 2 will be described in the embodiment, the present invention is not limited thereto. As another example, the blow-off device 10 may be provided on the roof of the vehicle 1.

Figure 3:
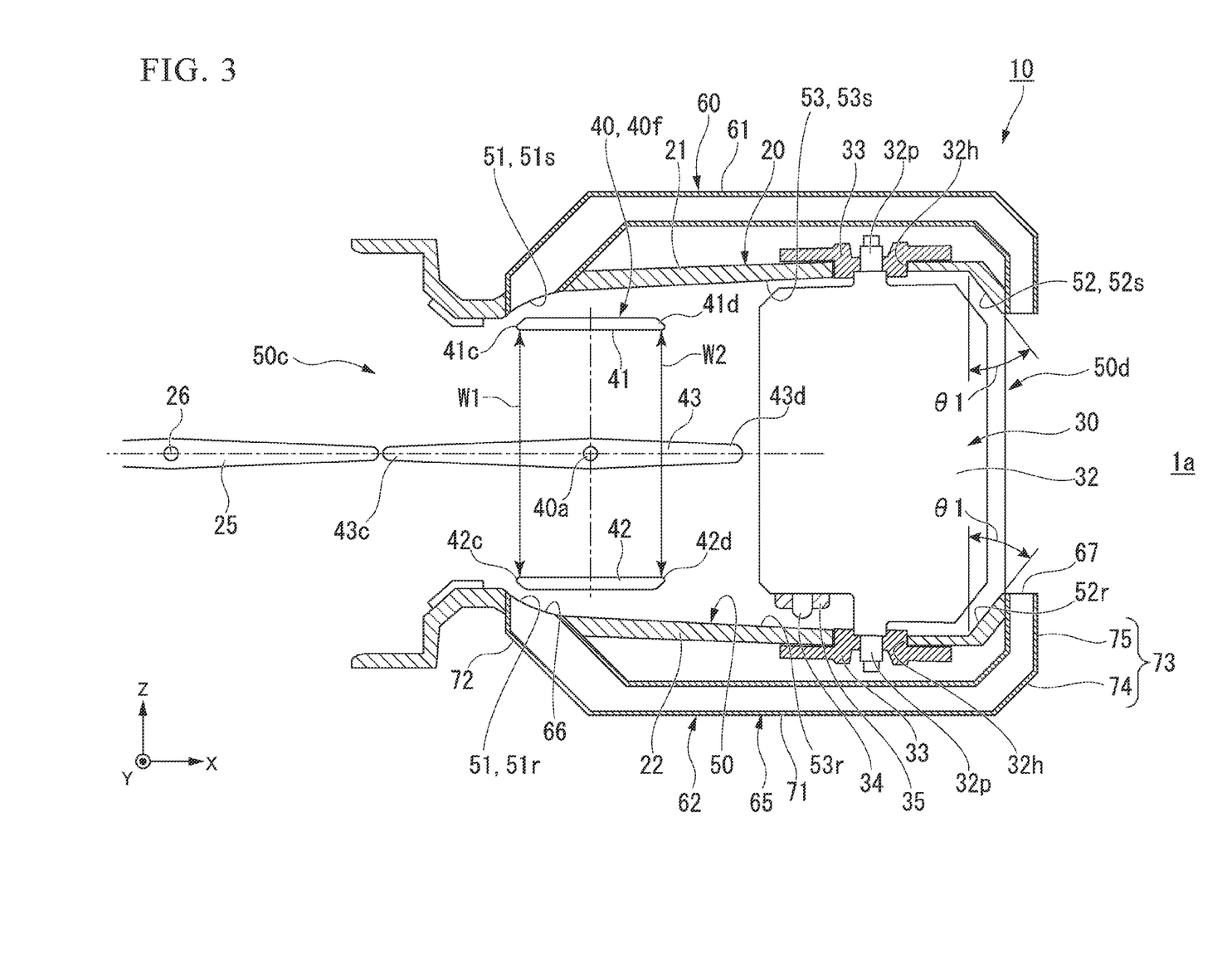
FIG. 3 is a cross-sectional view along a line of FIG. 2.

FIG. 3 is a cross-sectional view along a line of FIG. 2.

As shown in FIGS. 2 and 3, the blow-off device 10 is equipped with a case 20, a shutoff valve 25, a louver 30, a wind direction variable means 40, and a pressure adjustment unit (a bypass flow passage) 60. Each member constituting the blow-off device 10 is made of a resin material, a metal material, or the like.

The case 20 is equipped with a first case 21 and a second case 22. The case 20 is divided into two cases, the first case 21 and the second case 22, in the Z direction. The first case 21 is disposed in the +Z direction, and the second case 22 is disposed in the −Z direction. The case 20 is equipped with an inflow port 50c, a blow-off port (outflow port) 50d, and a ventilation passage 50.

The inflow port 50c is provided at an end portion (the duct 5 side) of the case 20 in the −X direction and is connected to the duct 5. The blow-off port 50d is provided at an end portion of the case 20 in the +X direction (the passenger compartment 1a side). The blow-off port 50d is opened to the passenger compartment 1a in the +X direction. That is, the blow-off port 50d is opened so that the conditioned air conditioned by the air conditioner 3 can be blown off toward the passenger compartment 1a.

The ventilation passage 50 extends between the inflow port 50c and the blow-off port 50d inside the case 20. The ventilation passage 50 is formed to be able to ventilate in a ventilation direction (+X direction) from the inflow port 50c to the blow-off port 50d. That is, the inflow port 50c is formed on the upstream side of the ventilation passage 50 in the ventilation direction, and the blow-off port 50d is formed on the downstream side thereof.

A first inclined part (an upstream side inclined part) 51, a second inclined part (an inclined part) 52, and an intermediate part 53 are formed on an inner surface of the ventilation passage 50 (that is, the case 20).

The first inclined part 51 is provided between the inflow port 50c and the intermediate part 53 to be adjacent to the downstream side of the inflow port 50c of the case 20. The first inclined part 51 is inclined outward with respect to the case 20 in the ventilation direction. That is, a first inclined part 51s formed on the inner surface of the case 20 in the +Z direction (inner surface facing the −Z direction) is inclined in the +Z direction toward the +X direction. A first inclined part 51r formed on the inner surface of the case 20 in the −Z direction (an inner surface facing the +Z direction) is inclined in the −Z direction toward the +X direction. The first inclined part 51 is formed in a curved surface shape to have a circular arc shape in a cross section perpendicular to the Y direction.

The second inclined part 52 is provided on the blow-off port 50d side of the ventilation passage 50 to be adjacent to the upstream side of the blow-off port 50d. The second inclined part 52 is inclined inward with respect to the case 20 in the ventilation direction. That is, a second inclined part 52s formed on the inner surface of the case 20 in the +Z direction (an inner surface facing the −Z direction) is inclined in the −Z direction at an angle θ1 toward the +X direction. The angle θ1 is an inclination angle of the second inclined part 52s in the Z direction.

A second inclined part 52r formed on the inner surface of the case 20 in the −Z direction (an inner surface facing the +Z direction) is inclined in the +Z direction at an angle θ1 toward the +X direction. The angle θ1 is an inclination angle of the second inclined part 52r in the Z direction. The second inclined part 52 is formed in a planar shape to exhibit a straight line in a cross section perpendicular to the Y direction (e.g., FIG. 3).

The intermediate part 53 is formed between the first inclined part 51 and the second inclined part 52. The intermediate part 53 is formed in a planar shape and is disposed parallel to an XY plane. The intermediate part 53 is continuously connected between the end portion of the first inclined part 51 in +X direction and the end portion of the second inclined part 52 in the −X direction. That is, an intermediate part 53s formed on the inner surface of the case 20 in the +Z direction (an inner surface facing the −Z direction) is formed between the first inclined part 51s and the second inclined part 52s. The intermediate part 53r formed on the inner surface of the case 20 in the −Z direction (an inner surface facing the +Z direction) is formed between the first inclined part 51r and the second inclined part 52r.

The ventilation passage 50 of the case 20 is provided with a shutoff valve 25, a wind direction variable means 40, and a louver 30. The shutoff valve 25 is arranged at the inflow port 50c. The wind direction variable means 40 is arranged adjacent to the downstream side of the inflow port 50c. The louver 30 is disposed adjacent to the upstream side of the second inclined part 52.

The shutoff valve 25 is formed in a rectangular flat plate shape in which the Y direction is set as the longitudinal direction. The shutoff valve 25 is supported in a state in which it can rotate around a rotation axis 26 parallel to the Y direction. The shutoff valve 25 adjusts an amount of air flowing into the blow-off device 10.

The louver 30 is equipped with a plurality of blade plates 32, a connecting member 35, and a dial 38. The blade plates 32 are formed in substantially quadrangular plate shapes. The plurality of blade plates 32 are disposed parallel in the Y direction. Rotating pins 32p are erected at both end portions of the blade plates 32 in the Z direction. The rotating pins 32p are inserted into holes 32h of the case 20 via the bracket 33. As a result, the blade plates 32 are supported by the case 20 in a rotatable state. Connecting pins 34 are erected at the end portions of the blade plates 32 in the −Z direction and at positions away from the rotating pins 32p. For example, the rotating pins 32p are disposed at the end portion in the +X direction, and the connecting pins 34 are disposed at the end portion in the −X direction away from the rotating pins 32p.

The connecting member 35 is equipped with a plurality of holes. The connecting pins 34 of the plurality of blade plates 32 are inserted into the plurality of holes of the connecting member 35.

The dial 38 is connected to a central rotating pin 30p of a central blade plate 32C. When the dial 38 is rotated, the central blade plate 32C is rotated. In conjunction with this, the plurality of blade plates 32 connected by the connecting member 35 rotate. The louver 30 changes the wind direction of the conditioned air (air-conditioned wind) blown off from the blow-off port 50d in the Y direction by rotating the blade plate 32.

The wind direction variable means 40 is made up of a plurality of fins 40f, and the plurality of fins 40f are rotatably provided on the ventilation passage 50. The wind direction variable means 40 is a member capable of changing the wind direction of the conditioned air flowing in from the inflow port 50c toward the intermediate part 53 and the second inclined part 52 by the plurality of fins 40f. Specifically, the wind direction variable means 40 is equipped with the plurality of fins 40f, an end plate 45, a third link member 47, and a fourth link member 48.

The plurality of fins 40f include a first outer fin (outer fin) 41, an intermediate fin 43, and a second outer fin (outer fin) 42 disposed side by side in the Z direction. The plurality of fins 40f are formed in rectangular flat plate shapes in which the Y direction is set as the longitudinal direction respectively. The end plate 45 is disposed parallel to an XZ plane. The end plates 45 are fixed to both end portions of the plurality of fins 40f in the Y direction. A rotating pin 40p is erected on the outer surface of the end plate 45 in the Y direction. The rotating pin 40p is inserted into the hole of the case 20. As a result, the wind direction variable means 40 is supported by the case 20 in a state in which it can rotate around the rotation axis 40a parallel to the Y direction.

The third link member 47 and the fourth link member 48 are sequentially connected to a rotating pin 40p of the wind direction variable means 40 in the +Y direction. The fourth link member 48 is supported by a link support part (not shown) in a rotatable state. When an end portion of the fourth link member 48 in the +X direction is moved in the Z direction, the wind direction variable means 40 rotates inside the case 20.

The wind direction variable means 40 rotates about a central axis (rotation axis) 40a of the rotating pin 40p. As one of the rotating positions of the wind direction variable means 40, there is a position (a position of FIG. 3) at which the first outer fin 41 and the second outer fin 42 are plane-symmetric with respect to the XY plane including the rotation axis 40a. This rotating position is called a standard position of the wind direction variable means 40. A state in which the wind direction variable means 40 is at the standard position is called a standard state of the wind direction variable means 40. Hereinafter, configurations of the plurality of fins 40f in the standard state of the wind direction variable means 40 will be described.

The first outer fin 41 and the second outer fin 42 are disposed at both end portions of the wind direction variable means 40 in the Z direction. The first outer fin 41 is disposed at the end portion in the +Z direction, and the second outer fin 42 is disposed at the end portion in the −Z direction. In the standard state of the wind direction variable means 40, the first outer fin 41 and the second outer fin 42 are disposed, for example, in parallel in the X direction. That is, the first outer fin 41 is disposed parallel to the XY plane. The second outer fin 42 is disposed parallel to the XY plane.

Here, an interval between the end portion 41c of the first outer fin 41 in the −X direction and the end portion 42c of the second outer fin 42 in the −X direction is defined as W1. An interval between the end portion (a downstream side end portion) 41d of the first outer fin 41 in the +X direction and the end portion (a downstream side end portion) 42d of the second outer fin 42 in the +X direction is defined as W2. The first outer fin 41 and the second outer fin 42 are formed so that, for example, W1 has the same size as W2.

As another example, the first outer fin 41 and the second outer fin 42 may be inclined inward with respect to the case 20 in the +X direction, for example, in the standard state of the wind direction variable means 40. In this case, the first outer fin 41 is inclined in the −Z direction toward the +X direction. The second outer fin 42 is inclined in the +Z direction toward the +X direction.

Figure 4:
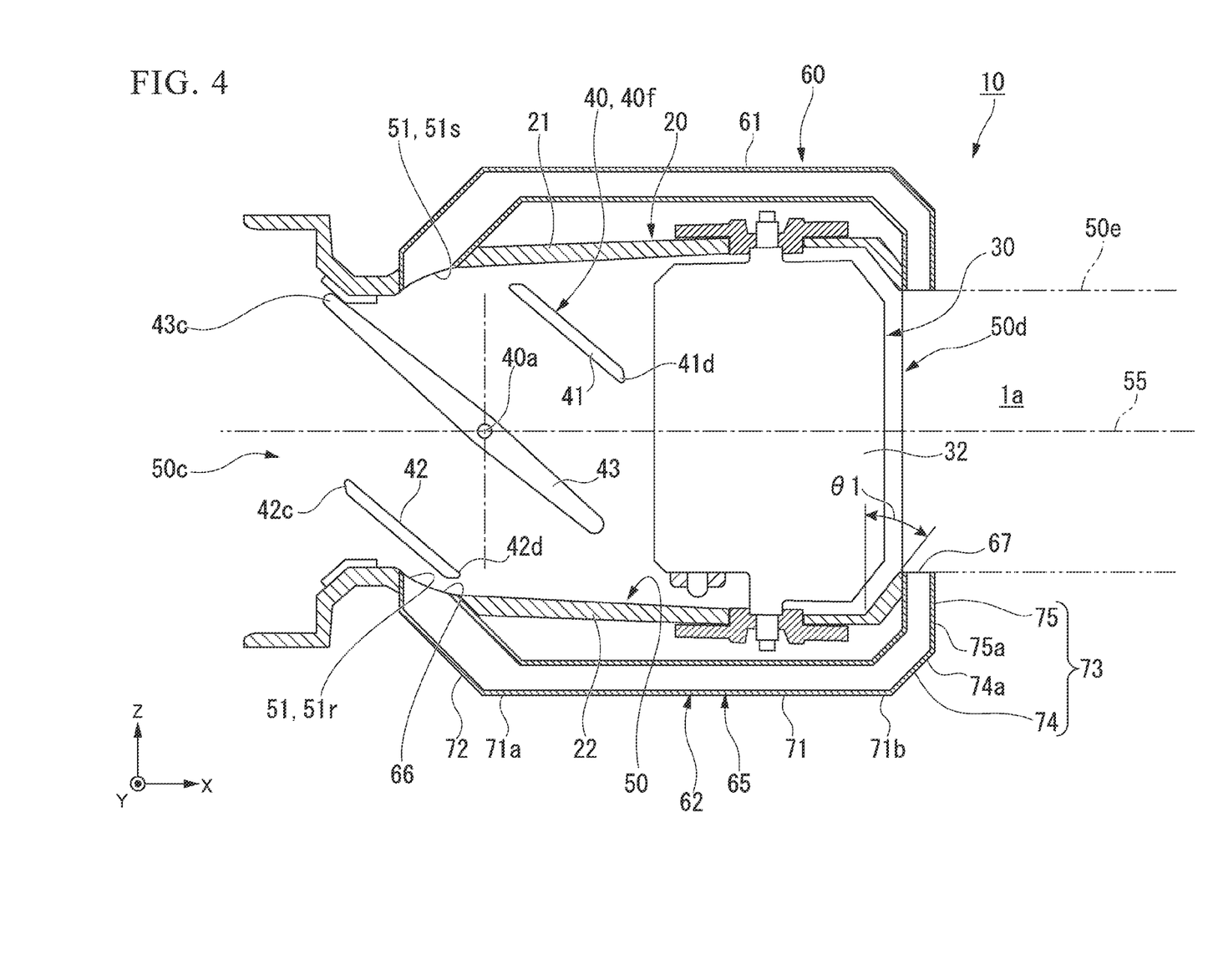
FIG. 4 is a cross-sectional view in which a wind direction variable means of the embodiment is rotated to the maximum rotating state.

FIG. 4 is a cross-sectional view in which the wind direction variable means is rotated to a maximum rotating state.

As shown in FIG. 4, in a state in which the wind direction variable means 40 is rotated to the maximum position in the −Z direction, the end portion 43c of the intermediate fin 43 in the −X direction comes into contact with the inner surface (the inner surface in the +Z direction) of the inflow port 50c of the case 20. In this state, the plurality of fins 40f are greatly inclined in the same direction. Specifically, the plurality of fins 40f are greatly inclined in the −Z direction toward the +X direction.

In a state in which the plurality of fins 40f are greatly inclined, the end portion 42d of the second outer fin 42 in the +X direction is disposed on the downstream side (+X direction) of the first inclined part 51r. Therefore, the cross-sectional area of the flow passage between the second outer fin 42 and the inner surface (wall surface) of the ventilation passage 50 in the −Z direction decreases. This rotating position is called a maximum rotating state of the wind direction variable means 40 in the −Z direction.

On the other hand, in a state in which the wind direction variable means 40 is rotated to the maximum position in the +Z direction, the end portion 43c of the intermediate fin 43 in the −X direction comes into contact with the inner surface (inner surface in the −Z direction) of the inflow port 50c of the case 20. In this state, the plurality of fins 40f are greatly inclined in the +Z direction toward the +X direction. In a state in which the plurality of fins 40f are greatly inclined, the end portion 41d of the first outer fin 41 in the +X direction is disposed on the downstream side (that is, in the +X direction) of the first inclined part 51s. This rotating position is called a maximum rotating state of the wind direction variable means 40 in the +Z direction.

As shown in FIG. 3, the first inclined part 51 of the case 20 is formed in a curved surface shape along a rotating locus of the end portion 41c of the first outer fin 41 in the −X direction or the end portion 42c of the second outer fin 42 in the −X direction. The first inclined part 51s is formed in a curved surface shape along the rotating locus of the end portion 41c of the first outer fin 41 in the −X direction. That is, a distance R2 from the rotation axis 40a of the wind direction variable means 40 to the first inclined part 51s is constant.

Here, the distance from the rotation axis 40a to the end portion 41c of the first outer fin 41 in the −X direction is R1. The first inclined part 51s is formed so that R2 is slightly larger than R1.

Similarly, the first inclined part 51r is formed in a curved surface shape along the rotating locus of the end portion 42c of the second outer fin 42 in the −X direction. The distance R2 from the rotation axis 40a to the first inclined part 51r is slightly larger than the distance R1 from the rotation axis 40a to the end portion 42c of the second outer fin 42 in the −X direction.

The intermediate fin 43 is disposed between the first outer fin 41 and the second outer fin 42 in the Z direction. The intermediate fin 43 is disposed parallel to the XY plane in the standard state of the wind direction variable means 40. The intermediate fin 43 is formed to be longer than the first outer fin 41 and the second outer fin 42 in the X direction.

The end portion 43d of the intermediate fin 43 in the +X direction is disposed in the +X direction from the end portion 41d of the first outer fin 41 in the +X direction and the end portion 42d of the second outer fin 42 in the +X direction. The end portion 43c of the intermediate fin 43 in the −X direction is disposed in the −X direction from the end portion 41c of the first outer fin 41 in the −X direction and the end portion 42c of the second outer fin 42 in the −X direction.

Inside the case 20, the ventilation passage 50 is provided with a pressure adjustment unit 60. The pressure adjustment unit 60 includes a first pressure adjustment unit 61 and a second pressure adjustment unit 62. The first pressure adjustment unit 61 is provided in the +Z direction which is the outside of the first case 21. The second pressure adjustment unit 62 is provided in the −Z direction which is the outside of the second case 22.

The first pressure adjustment unit 61 and the second pressure adjustment unit 62 are formed symmetrically in the X direction. Therefore, the components of the first pressure adjustment unit 61 are designated by the same reference numerals as those of the second pressure adjustment unit 62, the second pressure adjustment unit 62 will be described in detail, and the description of the first pressure adjustment unit 61 will not be provided.

As shown in FIG. 4, the second pressure adjustment unit 62 has a bypass unit 65, a bypass inlet (inlet) 66, and a bypass outlet (outlet) 67. The bypass inlet 66 is provided to open to the first inclined part 51r. The bypass inlet 66 is formed to have, for example, substantially the same size as the first inclined part 51r in the Y direction. The bypass inlet 66 is provided on the upstream side (that is, the −X direction) of the end portion 42d of the second outer fin 42 in the +X direction, in the maximum rotating state of the wind direction variable means 40 (specifically, the plurality of fins 40f) in the −Z direction.

Here, the first inclined part 51r is inclined in the −Z direction toward the +X direction. That is, the first inclined part 51r is inclined outward of the second case 22 toward the downstream side in the ventilation direction. Further, the first inclined part 51 is formed in a curved surface shape along the rotating locus of the end portion 42c of the second outer fin 42 in the −X direction.

Therefore, the bypass inlet 66 is provided in the first inclined part 51r, and is inclined toward the outside of the ventilation passage 50 toward the downstream side in the ventilation direction. That is, the bypass inlet 66 is inclined in the −Z direction toward the +X direction.

A bypass outlet 67 is provided in the +X direction with respect to the bypass inlet 66. Further, the bypass outlet 67 is arranged in the +X direction from the ventilation passage 50, and is provided so as to open on the ventilation passage 50 when viewed from the +X direction. That is, the bypass outlet 67 is provided on the downstream side of the bypass inlet 66 and is provided to open on the ventilation passage 50 on the downstream side of the ventilation passage 50. The ventilation passage 50 includes an extension region 50e to the downstream side of the ventilation passage 50 (specifically, the blow-off port 50d).

In the embodiment, although an example in which the bypass outlet 67 opens to the extension region 50e will be described, the bypass outlet 67 may be opened to the ventilation passage 50 in the case 20.

The bypass outlet 67 is provided closer to the blow-off port 50d in the +X direction than the end portion (in other words, the blow-off port 50d) of the second inclined part 52 in the +X direction. Further, the bypass outlet 67 is formed to face a center 55 (that is, the Z direction) of the case 20 with respect to the angle θ1 of the second inclined part 52.

As described above, the bypass outlet 67 is provided on the downstream side of the second inclined part 52, and is formed to face the center 55 of the case 20 rather than the second inclined part 52. The bypass outlet 67 is formed, for example, to have substantially the same size as the blow-off port 50d in the Y direction.

The bypass inlet 66 and the bypass outlet 67 communicate with each other by the bypass unit 65. The bypass unit 65 has a communication part 71, an inflow part 72, and an outflow part 73.

The inflow part 72 is inclined in the −Z direction from the bypass inlet 66 to the end portion 71a of the communication part 71 in the −X direction toward the +X direction. The inflow part 72 causes the bypass inlet 66 to communicate with the end portion 71a of the communication part 71 in the −X direction.

The communication part 71 is disposed in the −Z direction of the second case 22 in the X direction and the Y direction along the second case 22. The outflow part 73 communicates with the end portion 71b of the communication part 71 in the +X direction. The outflow part 73 has a first outflow part 74 and a second outflow part 75. The first outflow part 74 and the second outflow part 75 are formed in a V shape.

Specifically, the first outflow part 74 is inclined in the +Z direction from the end portion 71b of the communication part 71 in the +X direction to the end portion 75a of the second outflow part 75 in the −Z direction toward the +X direction. The second outflow part 75 extends in the +Z direction from the end portion 74a of the first outflow part 74 in the +X direction to the bypass outlet 67. Accordingly, as described above, the bypass outlet 67 is formed to face the center 55 (that is, the Z direction) of the case 20 rather than the angle θ1 of the second inclined part 52.

Figure 5:
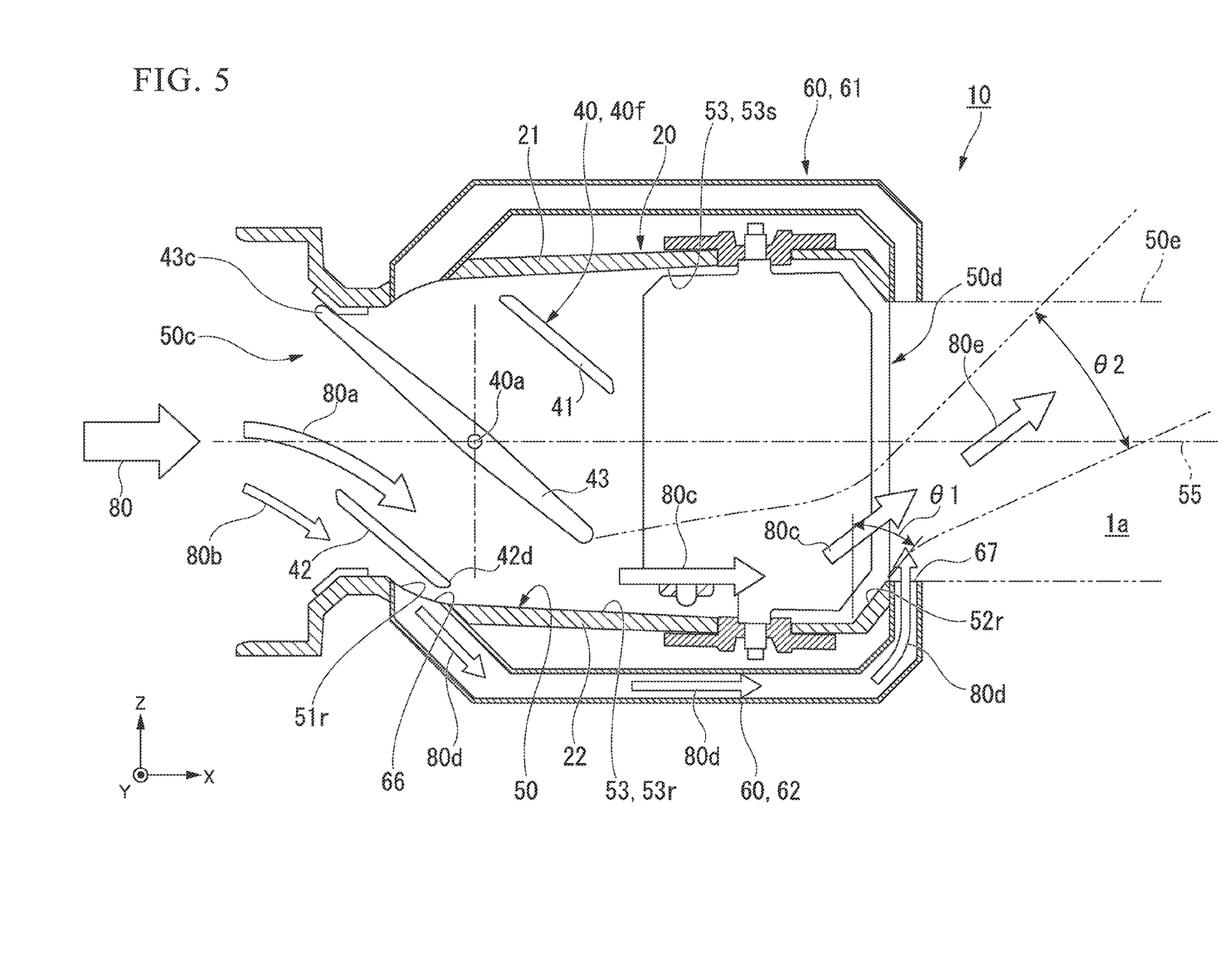
FIG. 5 is an explanatory view in which conditioned air is blown off from a blow-off port to a passenger compartment in a maximum rotating state of the wind direction variable means of the embodiment.

Next, an example of blowing off the conditioned air from the blow-off device 10 into the passenger compartment 1a will be described on the basis of FIG. 5. FIG. 5 is an explanatory view for blowing off the conditioned air from the blow-off port to the passenger compartment in the maximum rotating state of the wind direction variable means.

As shown in FIG. 5, in the wind direction variable means 40, a plurality of fins 40f are rotated in the maximum rotating state in the −Z direction. The end portion 43c of the intermediate fin 43 in the −Z direction is in contact with the inner surface (inner surface in the +Z direction) of the inflow port 50c of the case 20. The plurality of fins 40f are greatly inclined in the −Z direction toward the +X direction, and the cross-sectional area of the flow passage between the second outer fin 42 and the inner surface of the ventilation passage 50 in the −Z direction is suppressed to be small.

In this state, the conditioned air 80 flows into the inflow port 50c of the blow-off device 10 from the air conditioner 3 via the duct 5 (see both FIG. 2). The conditioned air 80 having flowed into the inflow port 50c flows into the ventilation passage 50 via the inflow port 50c. The wind direction of the conditioned air 80 having flowed into the ventilation passage 50 is greatly changed as the conditioned airs 80a and 80b in the direction of inclining from the +X direction to the −Z direction by the plurality of fins 40f.

The conditioned air 80a flows in between the intermediate fin 43 and the second outer fin 42. The conditioned air 80b flows in between the second outer fin 42 having a small cross-sectional area of the flow passage and the inner surface of the ventilation passage 50 in the −Z direction.

Part of the conditioned air 80a and the conditioned air 80b whose wind direction has been changed hits the inner surface of the intermediate part 53r of the ventilation passage 50 in the −Z direction and flows downstream as a conditioned air 80c along the inner surface of the intermediate part 53r. A remaining conditioned air 80d of the conditioned air 80b will be described below in detail.

The wind direction of the conditioned air 80c flowing along the inner surface of the intermediate part 53r is changed in a predetermined direction along the inner surface of the second inclined part 52r. The conditioned air 80c whose wind direction has been changed is blown off from the blow-off port 50d to the passenger compartment 1a in a predetermined direction along the inner surface of the second inclined part 52r.

Next, the remaining conditioned air 80d of the conditioned air 80b will be described in detail.

Since the plurality of fins 40f are disposed in the maximum rotating state in the −Z direction, the bypass inlet 66 of the second pressure adjustment unit 62 is located on the upstream side of the end portion 42d of the second outer fin 42 in the +X direction (that is, the −X direction).

Therefore, the remaining conditioned air 80*d* can be released from the bypass inlet 66 to the second pressure adjustment unit 62 to prevent the pressure of the ventilation passage 50 from exceeding a predetermined value. Accordingly, it is possible to suppress part of the flow velocity of the conditioned air 80*b* between the second outer fin 42 having a small cross-sectional area of the flow passage of the ventilation passage 50 and the inner surface of the ventilation passage 50 in the −Z direction, and the wind noise can be suppressed.

Here, for example, it is also conceivable that the remaining conditioned air 80*d* having flowed into the second pressure adjustment unit 62 from the bypass inlet 66 releases from the bypass outlet 67 to the inside of the instrument panel 2 (see FIG. 1). However, in this case, there is a risk of an occurrence of a dew condensation on the components accommodated inside the instrument panel 2.

Therefore, the bypass outlet 67 is disposed downstream (the +X direction) from the bypass inlet 66 and is provided on the ventilation passage 50 (specifically, on the extension region 50*e* to the downstream side of the ventilation passage 50). Therefore, the remaining conditioned air 80*d* released to the second pressure adjustment unit 62 can be returned to the conditioned air 80*c* of the ventilation passage 50 or the conditioned air 80*c* blown off from the ventilation passage 50. Accordingly, the remaining conditioned air 80*d* can be prevented from being released to the inside of the instrument panel 2, and dew condensation can be suppressed from occurring in the internal components of the instrument panel 2.

Incidentally, as described above, the conditioned air 80*c* that hits the inner surface of the second inclined part 52*r* is guided to the blow-off port 50*d* toward one side along the second inclined part 52*r*, and is blown off from the blow-off port 50*d* to the passenger compartment 1*a* toward one side. Downstream from the second inclined part 52*r*, the bypass outlet 67 is formed to face the center 55 of the case 20 rather than the angle θ1 of the second inclined part 52*r*.

Accordingly, by making the remaining conditioned air 80*d* blown off from the bypass outlet 67 hit the conditioned air 80*c* blown off to the passenger compartment 1*a* toward one side, it is possible to widely secure the blowing angle θ2 of the conditioned air 80*e* blown off into the passenger compartment 1*a*.

The plurality of fins 40*f* are rotated to the maximum rotating state in the −Z direction. Accordingly, the end portion 42*d* of the second outer fin 42 in the +X direction is disposed close to the inner surface of the ventilation passage 50 in the −Z direction. Therefore, the cross-sectional area of the flow passage between the end portion 42*d* of the second outer fin 42 in the +X direction and the inner surface of the ventilation passage 50 in the −Z direction decreases.

Therefore, a bypass inlet 66 is provided on the upstream side of the end portion 42*d* in the +X direction at the time of maximum rotation of the second outer fin 42. Therefore, the remaining conditioned air 80*d* can be released to the bypass inlet 66 from a place where the cross-sectional area of the flow passage easily decreases.

As a result, the flow velocity of part of the conditioned air 80*b* can be suppressed more satisfactorily between the second outer fin 42 and the inner surface of the ventilation passage 50 in the −Z direction, and the wind noise can be suppressed more effectively.

Further, the bypass inlet 66 is inclined toward the outside of the ventilation passage 50 toward the downstream side. Therefore, in a state in which the conditioned air 80*b* is directed to the second inclined part 52*r* by the second outer fin 42, the bypass inlet 66 can be inclined in accordance with the wind direction of the conditioned air 80*b* to increase the area of the bypass inlet 66. As a result, the remaining conditioned air 80*d* of the conditioned air 80*b* can easily flow into the bypass inlet 66, and the remaining conditioned air 80*d* can smoothly flow into the bypass inlet 66.

Even when the plurality of fins 40*f* of the wind direction variable means 40 are rotated to the maximum rotating state in the +Z direction, the remaining conditioned air can be released from a place in which the cross-sectional area of the flow passage is small by the first pressure adjustment unit 61, as in the maximum rotating state in the −Z direction. As a result, the flow velocity of the conditioned air can be satisfactorily suppressed in a place in which the cross-sectional area of the flow passage is small, and the wind noise can be effectively suppressed.

Figure 6:
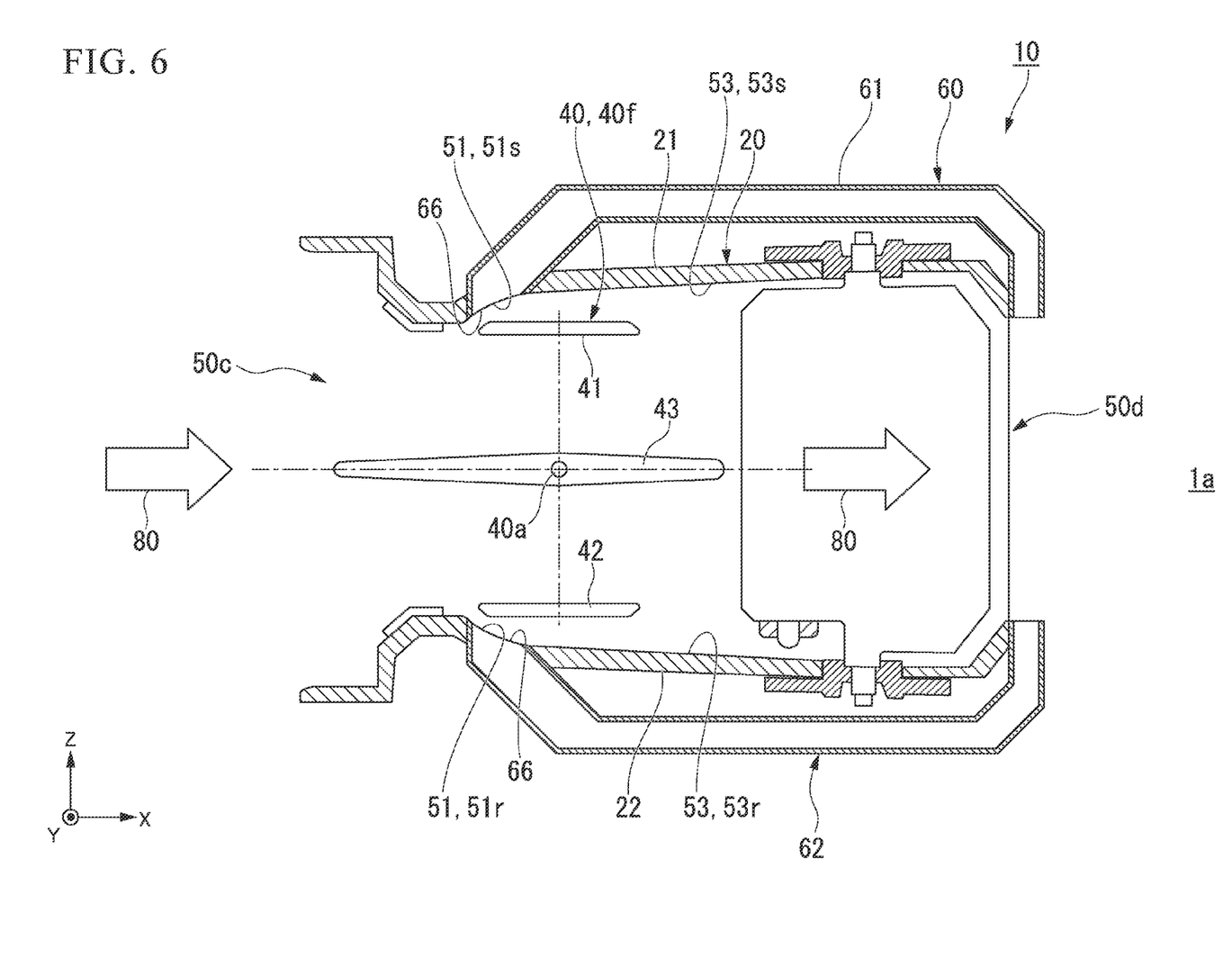
FIG. 6 is an explanatory view in which the conditioned air is blown out from the blow-off port to the passenger compartment in a standard state of the wind direction variable means of the embodiment.

Next, a case in which the wind direction variable means 40 is disposed in the standard state will be described on the basis of FIG. 6. FIG. 6 is an explanatory view for blowing off the conditioned air from the blow-off port to the passenger compartment in the standard state of the wind direction variable means.

As shown in FIG. 6, the conditioned air 80 of the inflow port 50*c* flows straight in the +X direction toward the blow-off port 50*d* along the inner surfaces of the intermediate parts 53*r* and 53*s* by the plurality of fins 40*f*. In this case, a large cross-sectional area of the flow passage of the ventilation passage 50 is secured. Therefore, there is no risk of occurrence of the wind noise of the conditioned air 80 due to the flow of the conditioned air 80 through the ventilation passage 50.

Here, between the inflow port 50*c* and the intermediate part 53*r*, the first inclined part 51*r* is inclined outward from the second case 22. A bypass inlet 66 is provided in the first inclined part 51*r*. Between the inflow port 50*c* and the intermediate part 53*s*, the first inclined part 51*s* is inclined outward from the first case 21. A bypass inlet 66 is provided in the first inclined part 51*s*.

Therefore, in the standard state of the wind direction variable means 40, it is possible to suppress the inflow of the conditioned air 80 along the first inclined parts 51*r* and 51*s*. That is, by providing the bypass inlet 66 at the first inclined parts 51*r* and 51*s*, it is possible to prevent the conditioned air 80 from flowing into the bypass inlet 66.

As a result, in the standard state in which the conditioned air 80 is caused to flow straight toward the blow-off port 50*d* by the wind direction variable means 40 (that is, in a state in which no wind noise is generated), the influence of the first pressure adjustment unit 61 and the second pressure adjustment unit 62 can be suppressed to small.

Although preferable examples of the present invention have been described above, the present invention is not limited to these examples. Addition, omission, replacement, and other changes can be made to configurations without departing from the spirit of the present invention. The present invention is not limited by the above description, but only by the appended claims.

For example, in the above-described embodiment, although an example in which the blow-off port 50*d* is provided at the end portion of the case 20 in the +X direction and the remaining conditioned air 80*d* is released to the passenger compartment 1*a* has been described, the present invention is not limited to thereto. As another example, the blow-off port 50*d* may be disposed inside the instrument panel 2 and the remaining conditioned air 80*d* may be released to the inside of the instrument panel 2.

EXPLANATION OF REFERENCES

1 Vehicle
1*a* Passenger compartment
3 Air conditioner (air conditioner unit)
5 Duct
10 Blow-off device (blow-off device for air conditioner)
20 Case
40 Wind direction variable means
40*f* Multiple fins
41 First outer fin (outer fin)
41*d* End portion in +X direction (downstream side end portion)
42 Second outer fin (outer fin)
42*d* End portion in +X direction (downstream side end portion)
50 Ventilation passage
50*c* Inflow port
50*d* Blow-off port
51, 51*r*, 51*s* First inclined part (upstream side inclined part)
52, 52*r*, 52*s* Second inclined part (inclined part)
53, 53*r*, 53*s* Intermediate part
55 Center of case
60 Pressure adjustment unit
61 First pressure adjustment unit
62 Second pressure adjustment unit
66 Bypass inlet (inlet)
67 Bypass outlet (outlet)
θ1 Angle of second inclined part

What is claimed is:

1. A blow-off device of an air conditioner comprising:
a case connected to an air conditioning unit of a vehicle via a duct;
an inflow port provided on the duct side of the case and connected to the duct;
a blow-off port provided on a passenger compartment side of the case to blow off air toward the passenger compartment;
a ventilation passage formed inside the case so that ventilation is allowed from the inflow port to the blow-off port;
an inclined part which is inclined in an inward direction of the case in a ventilation direction on the blow-off port side of the ventilation passage;
an intermediate part formed between the inflow port and the inclined part;
a wind direction variable unit rotatably provided on the ventilation passage and capable of changing a wind direction from the inflow port toward the intermediate part and the inclined part; and
a pressure adjustment unit which is provided to open to the ventilation passage to prevent the pressure of the ventilation passage from exceeding a predetermined value by releasing air to the outside of the ventilation passage,
wherein an inlet of the pressure adjustment unit is provided more upstream than a downstream side end portion of the wind direction variable unit at the time of maximum rotation of the wind direction variable unit.

2. The blow-off device of the air conditioner according to claim 1, wherein the outlet of the pressure adjustment unit is provided downstream of the inclined part and is formed to face a center of the case rather than an angle of the inclined part.

3. The blow-off device of the air conditioner according to claim 2, wherein the wind direction variable unit includes a plurality of fins, and
the inlet of the pressure adjustment unit is provided more upstream than the downstream side end portion at the time of maximum rotation of an outer fin of the plurality of fins.

4. The blow-off device of the air conditioner according to claim 3, wherein the inlet of the pressure adjustment unit is inclined in an outward direction of the ventilation passage toward the downstream side.

5. The blow-off device of the air conditioner according to claim 4, wherein
an upstream side inclined part inclined in an outward direction of the case in the ventilation direction is provided between the inflow port and the intermediate part, and
the inlet of the pressure adjustment unit is provided on the upstream side inclined part.

6. The blow-off device of the air conditioner according to claim 3, wherein
an upstream side inclined part inclined in an outward direction of the case in the ventilation direction is provided between the inflow port and the intermediate part, and
the inlet of the pressure adjustment unit is provided on the upstream side inclined part.

7. The blow-off device of the air conditioner according to claim 2, wherein the inlet of the pressure adjustment unit is inclined in an outward direction of the ventilation passage toward the downstream side.

8. The blow-off device of the air conditioner according to claim 7, wherein
an upstream side inclined part inclined in an outward direction of the case in the ventilation direction is provided between the inflow port and the intermediate part, and
the inlet of the pressure adjustment unit is provided on the upstream side inclined part.

9. The blow-off device of the air conditioner according to claim 2, wherein
an upstream side inclined part inclined in an outward direction of the case in the ventilation direction is provided between the inflow port and the intermediate part, and
the inlet of the pressure adjustment unit is provided on the upstream side inclined part.

10. The blow-off device of the air conditioner according to claim 1, wherein the wind direction variable unit includes a plurality of fins, and
the inlet of the pressure adjustment unit is provided more upstream than the downstream side end portion at the time of maximum rotation of an outer fin of the plurality of fins.

11. The blow-off device of the air conditioner according to claim 10, wherein the inlet of the pressure adjustment unit is inclined in an outward direction of the ventilation passage toward the downstream side.

12. The blow-off device of the air conditioner according to claim 11, wherein
an upstream side inclined part inclined in an outward direction of the case in the ventilation direction is provided between the inflow port and the intermediate part, and the inlet of the pressure adjustment unit is provided on the upstream side inclined part.

13. The blow-off device of the air conditioner according to claim 10, wherein
an upstream side inclined part inclined in an outward direction of the case in the ventilation direction is provided between the inflow port and the intermediate part, and
the inlet of the pressure adjustment unit is provided on the upstream side inclined part.

14. The blow-off device of the air conditioner according to claim 1, wherein the inlet of the pressure adjustment unit is inclined in an outward direction of the ventilation passage toward the downstream side.

15. The blow-off device of the air conditioner according to claim 14, wherein
an upstream side inclined part inclined in an outward direction of the case in the ventilation direction is provided between the inflow port and the intermediate part, and
the inlet of the pressure adjustment unit is provided on the upstream side inclined part.

16. The blow-off device of the air conditioner according to claim 1, wherein
an upstream side inclined part inclined in an outward direction of the case in the ventilation direction is provided between the inflow port and the intermediate part, and
the inlet of the pressure adjustment unit is provided on the upstream side inclined part.

* * * * *